(12) United States Patent
Diao et al.

(10) Patent No.: US 8,797,955 B2
(45) Date of Patent: Aug. 5, 2014

(54) DUPLEX COMMUNICATION METHOD, TERMINAL SCHEDULING METHOD AND SYSTEM

(75) Inventors: Xinxi Diao, Guangdong Province (CN); Zhengrong Lai, Guangdong Province (CN); Xiaodong Zhu, Guangdong Province (CN); Zhifeng Ma, Guangdong Province (CN); Guang Yang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 276 days.

(21) Appl. No.: 13/258,190

(22) PCT Filed: Jun. 22, 2010

(86) PCT No.: PCT/CN2010/074244
§ 371 (c)(1),
(2), (4) Date: May 18, 2012

(87) PCT Pub. No.: WO2011/079587
PCT Pub. Date: Jul. 7, 2011

(65) Prior Publication Data
US 2012/0257551 A1    Oct. 11, 2012

(30) Foreign Application Priority Data
Dec. 31, 2009   (CN) .......................... 2009 1 0260739

(51) Int. Cl.
*H04B 7/216* (2006.01)
*H04W 72/04* (2009.01)
*H04W 72/08* (2009.01)

(52) U.S. Cl.
CPC ........ *H04W 72/0493* (2013.01); *H04W 72/048* (2013.01); *H04W 72/082* (2013.01)
USPC .......................................................... 370/328

(58) Field of Classification Search
CPC ... H04L 5/0007; H04L 5/0053; H04L 5/0039; H04W 72/042; H04W 72/0453; H04W 56/00
USPC .................. 370/318, 329, 348, 328, 342, 343
See application file for complete search history.

(56) References Cited

U.S. PATENT DOCUMENTS

| | | | |
|---|---|---|---|
| 2009/0274073 A1* | 11/2009 | Sutton | 370/280 |
| 2011/0194514 A1* | 8/2011 | Lee et al. | 370/329 |
| 2012/0057547 A1* | 3/2012 | Lohr et al. | 370/329 |

FOREIGN PATENT DOCUMENTS

| | | |
|---|---|---|
| CN | 101212249 A | 7/2008 |
| CN | 101212251 A | 7/2008 |
| CN | 101426267 A | 5/2009 |

OTHER PUBLICATIONS

International Search Report for PCT/CN2010/074244 dated Sep. 10, 2010.

*Primary Examiner* — Raj Jain
(74) *Attorney, Agent, or Firm* — Ling Wu; Stephen Yang; Ling and Yang Intellectual Property

(57) ABSTRACT

The present invention provides a method for duplexing communication, and a method and a system for scheduling a terminal. The method for scheduling a terminal includes: determining capability information of the terminal when the terminal makes a request for a service; allocating a band resource for the terminal according to the capability information of the terminal and the currently available band resources, and sending information of the allocated band resource to the terminal in the band currently used by the terminal, wherein the allocated band resource includes a bidirectionally used band, and at least one of the uplink band and downlink band includes a unidirectional band; and communicating with the terminal in the manner of time division duplexing by way of the allocated band resource. The present invention makes the best of the band resources near the TDD licensed band and improves the communication efficiency.

20 Claims, 7 Drawing Sheets

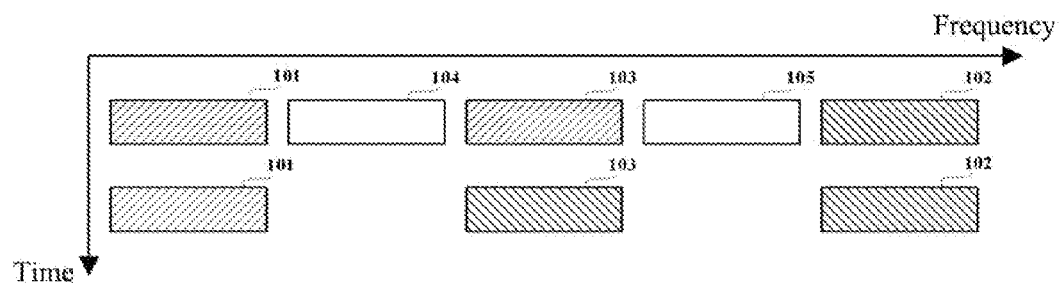
Fig. 1
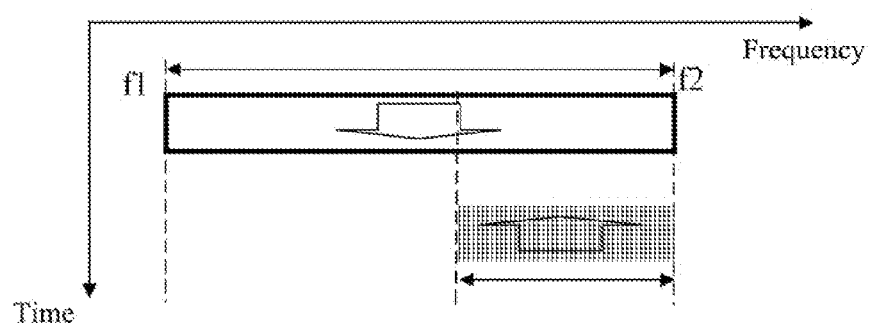
Fig. 2a
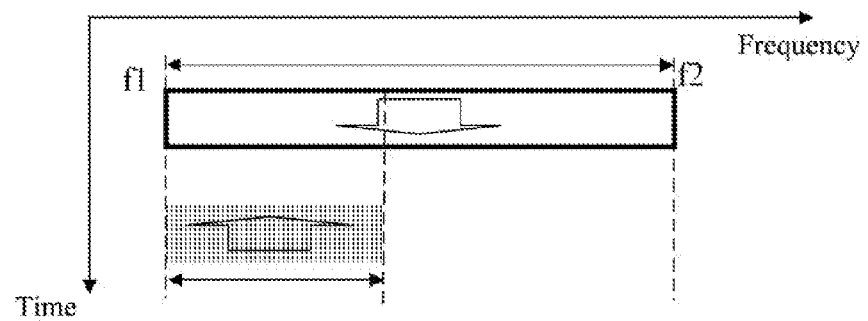

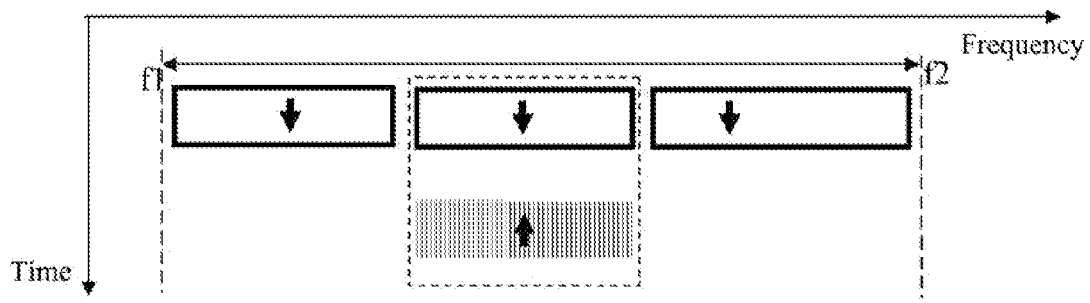
Fig. 2f
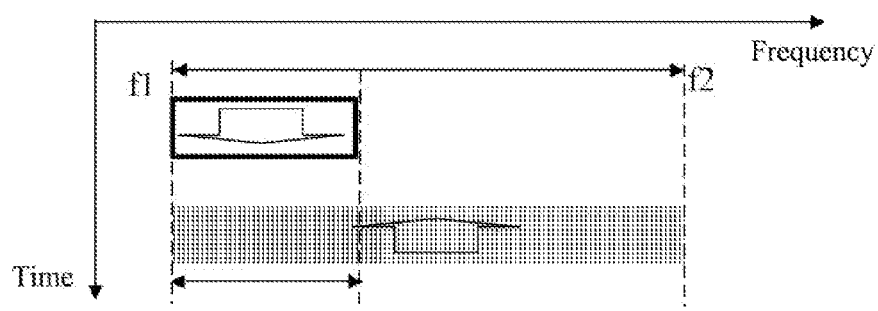
Fig. 3a
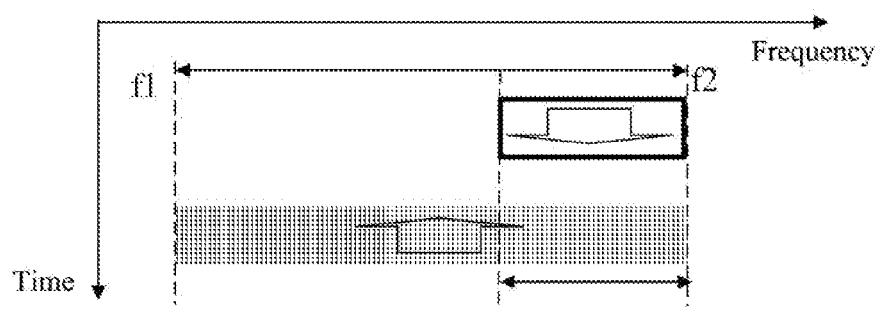

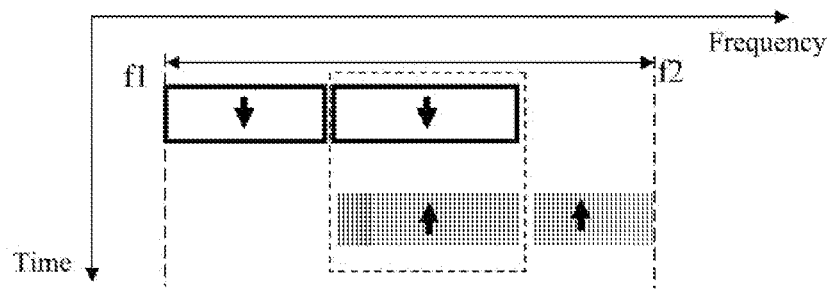
Fig. 4c
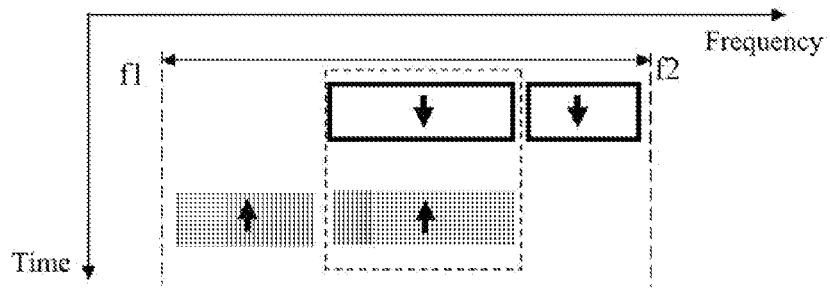
Fig. 4d
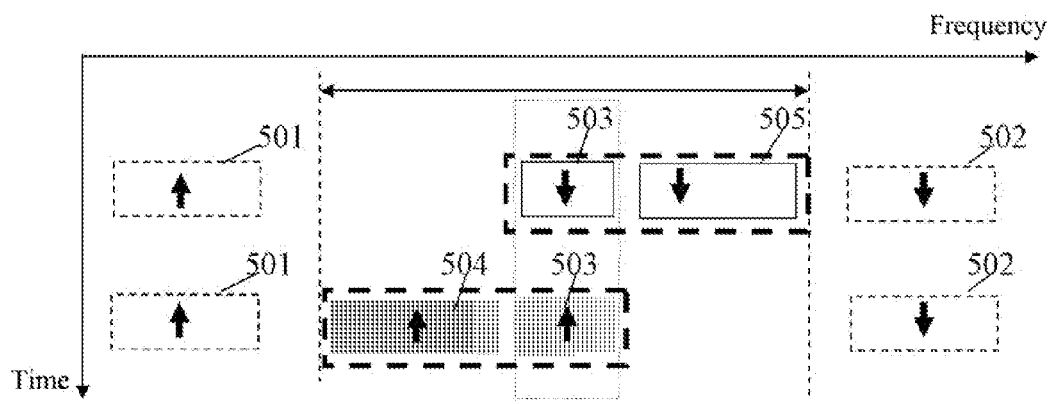

DUPLEX COMMUNICATION METHOD, TERMINAL SCHEDULING METHOD AND SYSTEM

TECHNICAL FIELD

The present invention relates to the mobile communication technology and, especially to a method for duplexing communication, a method and a system for scheduling a terminal.

BACKGROUND OF THE RELATED ART

In the mobile communication system, the Time Division Duplexing (TDD) mode has been widely used, and in the TDD mode, the uplink/downlink transmission uses one band in common, and the uplink transmission and downlink transmission are performed by way of different slots.

When the TDD band is adjacent to the Frequency Division Duplexing (FDD) band, in order to avoid the transceiving interference between the TDD system and the FDD system deployed in the adjacent band, a segment of idle band needs to act as a protection band between the TDD band and the band of the adjacent FDD system.

Especially in the current environment where the 2G, 3G, and Long Term Evolution (LTE) networks coexist, in order to lower the networking costs, during networking, the networking may need be carried out in the manner of Radio Access Network Sharing (RAN Sharing), and the RAN Sharing manner requires that the TDD system and FDD system should be co-site and even co-antenna; since in the TDD mode, the uplink/downlink transmission use one band in common, in such a band utilization mode, in order to avoid the interference between the TDD system and the FDD system deployed in the adjacent band, an enough wide band needs to be reserved from both sides of the TDD band as the protection band.

As shown in FIG. 1, the first band 101 and the second band 102 in FIG. 1 are FDD licensed bands, wherein the first band 101 is an uplink band in the FDD licensed band, and the second band 102 is a downlink band in the FDD licensed band, and the third band 103 is a band for communication by way of time division duplexing in the TDD licensed band. The uplink band and the downlink band are totally overlapped, the fourth band 104 is a protection band between the band for communication in the TDD licensed band and the uplink band in the FDD licensed band, and the fifth band 105 is a protection band between the band for communication in the TDD licensed band and the downlink band in the FDD licensed band.

In the communication system, the band resources are very shortage, and usually the protection band is in the idle state but neither can be used by the TDD system nor can be used by the FDD system, causing the waste of band resources.

SUMMARY OF THE INVENTION

The technical problem to be solved in the present invention is to provide a method for duplexing communication, a method and a system for scheduling a terminal so as to implement to make the best of the band in the communication process and improve the communication rate.

In order to solve the above technical problem, the present invention provides a method for duplexing communication, comprising: sending, by a wireless access point, a signal to a terminal in a downlink band within a first time interval; and receiving, by the wireless access point, a signal sent by the terminal in an uplink band within a second time interval, the downlink band including a bidirectionally used band in a manner of time division and a unidirectional downlink band, and the uplink band only including a bidirectionally used band in the manner of time division; or the downlink band only including a bidirectionally used band in the manner of time division, and the uplink band including a bidirectionally used band in the manner of time division and a unidirectional uplink band; or the downlink band including a bidirectionally used band in the manner of time division and a unidirectional downlink band, and the uplink band including a bidirectionally used band in the manner of time division and a unidirectional uplink band.

In order to solve the above technical problem, the present invention further provides a method for scheduling a terminal, comprising:

determining capability information of a terminal when the terminal makes a request for a service, wherein the capability information includes a band for receiving a signal supported by the terminal, a band for sending a signal supported by the terminal, and a capability of the terminal sending and receiving a signal in parallel in a time division duplexing (TDD) licensed band and a frequency division duplexing (FDD) licensed band;

allocating a band resource for the terminal according to the capability information of the terminal and currently available band resources, and sending information of the allocated band resource to the terminal in a band currently used by the terminal, wherein the allocated band resource includes a bidirectionally used band, and at least one of an uplink band and a downlink band includes a unidirectionally used band, and the unidirectionally used band is a band for unidirectional uplink transmission or a band for unidirectional downlink transmission; and communicating with the terminal in a manner of time division duplexing by way of the allocated band resource.

In order to solve the technical problem, the present invention further provides a system for scheduling a terminal, comprising:

a terminal, configured to: communicate in a manner of time division duplexing by way of an allocated band resource after receiving information of the allocated band resource; and a wireless access point, configured to: determine capability information of the terminal, allocate the band resource for the terminal according to the capability information of the terminal and currently available band resources, send the information of the allocated band resource to the terminal in a band currently used by the terminal, and communicate with the terminal in the manner of time division duplexing by way of the allocated band resource, wherein the capability information includes a band for receiving a signal supported by the terminal, a band for sending a signal supported by the terminal, and a capability of the terminal sending and receiving a signal in parallel in a time division duplexing (TDD) licensed band and a frequency division duplexing (FDD) licensed band, the allocated band resource includes a unidirectionally used band, at least one of an uplink band and a downlink band includes a unidirectionally used band, and the unidirectionally used band is a band for unidirectional uplink transmission or a band for unidirectional downlink transmission.

The method for duplexing communication, and the method and system for scheduling a terminal provided by the present invention achieve communication in the manner of time division duplexing by the allocated band resource, and the allocated band resource further includes band resources around the portion for achieving the TDD system communication in the TDD licensed band besides including the portion used in the uplink and downlink in the TDD licensed band for achieving the communication of the TDD system, making the best of the band resources around the TDD licensed band and improving the communication efficiency.

BRIEF DESCRIPTION OF DRAWINGS

FIG. 1 is a schematic diagram of a protection band in the related art;

FIGS. 2a-2c are schematic diagram I of the band utilization mode according to the embodiment of the present invention;

FIGS. 2d-2f are schematic diagram I of communication using multi-carrier according to the embodiments of the present invention;

FIGS. 3a-3c are schematic diagram II of the band utilization mode according to the embodiments of the present invention;

FIGS. 4c-4d are schematic diagram III of communication using multi-carrier according to the embodiments of the present invention;

FIGS. 5a-5b are schematic diagram IV of the band utilization mode according to the embodiments of the present invention;

PREFERRED EMBODIMENTS OF THE PRESENT INVENTION

Figure 2C:
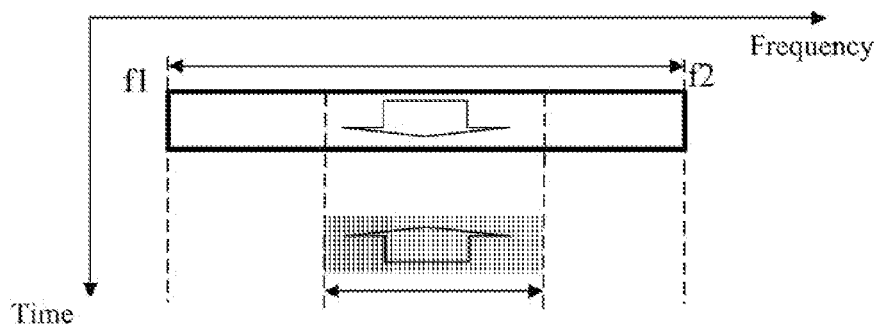

The embodiments of the present invention provide a method and a system for scheduling a terminal, which enable the terminal to flexibly use the TDD licensed band and the band resources nearby according to the communication capability of the terminal; since the communication is not only limited in the TDD licensed band and makes the full use of the idle band near the TDD licensed band, thereby improving the communication efficiency.

The scheme for using band resources described here can be referred to the scheme of the Flexible Bands TDD (FB-TDD), which is the extension in the aspect of the band resource utilization mode of the conventional TDD, and the FB-TDD has the following three features.

1. The Downlink Band (DLB) is different from the Uplink Band (ULB), and this difference is embodied in that: the center frequencies are different and/or bandwidths are different. The DLB and ULB can be one of the following relationships: DLB and ULB are partially overlapped; DLB and ULB are totally not overlapped; the bandwidths of DLB and ULB can be equal or not. When the bandwidths of DLB and ULB are equal and the center frequencies are the same, it is the conventional TDD mode. Accordingly, the conventional TDD is a special case of the FB-TDD, and the embodiments of the present invention mainly discuss the situation that DLB and ULB are partially overlapped.

2. The transceiving of the eNode B and the terminal is carried out in the manner of time division, and when transmission is carried out by the eNode B, the terminal is in the receiving state; and when receiving is carried out by the eNode B, the terminal is in the transmission state.

3. The uplink and downlink use the radio frame structures of the TDD systems with different bands, i.e., the uplink/downlink timeslot in the radio frame structure are respectively configured into two un-overlapped or partially overlapped uplink band and downlink band, so that the communication in the manner of time division duplexing is achieved.

The FB-TDD manner still possesses the capability of the TDD system flexibly configuring the uplink/downlink band resources, which is not possessed by the FDD or Half Duplex FDD (HD-FDD) system; and when the uplink/downlink bands in which the FB-TDD works are overlapped, the reciprocity of the channel can still be used in the overlapped band. Therefore, the FB-TDD belongs to a derivative mode generated for a purpose of improving the utilization ratio of the band and achieving the bidirectional communication under a specific pattern of the adjacent band. Just as the HD-FDD is a variant of the FDD, the FB-TDD is also a variant of TDD.

Although in terms of concepts, the FB-TDD and the HD-FDD as well as the TDD are different in terms of band utilization and performance, regarding to the engineer implementation, the FB-TDD can be achieved by aggregating the conventional TDD carriers and half duplex carriers in the TDD band. The implementation of FB-TDD in the manner of carrier aggregation not only can be compatible with the terminal only working in the TDD system but also can make the best of the TDD protocol, and it only needs to add corresponding contents of carrier aggregation.

Embodiment I

With such a time division duplexing communication method which flexibly uses the band, there are the following two band utilization situations:

the center frequencies of the uplink band and the downlink band are different and there is an overlapped portion between the uplink band and the downlink band; and the center frequencies of the uplink band and the downlink band are the same and the bandwidths of the uplink band and the downlink band are different.

In the uplink band, the portion overlapped with the downlink band is a bidirectionally used band in the manner of time division duplexing, except the portion overlapped with the downlink band, the remaining portion can be referred to as a unidirectional uplink band and dedicated for transmitting uplink signals in the corresponding slot, or transmitting downlink signals in a micro cell; and likewise, in the downlink band, the portion overlapped with the uplink band is a bidirectionally used band used in the manner of time division duplexing, except the portion overlapped with the uplink band, the remaining portion can be referred to as a unidirectional downlink band and dedicated for transmitting downlink signals in the corresponding slot, or transmitting uplink signals in a micro cell.

In sum, the unidirectional uplink band is a unidirectionally uplink used band, and the unidirectional downlink band is a unidirectional downlink used band.

Generally, the overlapped portion between the uplink band and the downlink band is a band for achieving the communication of the TDD system in the TDD licensed band, i.e., the third band in FIG. 1; the unidirectional uplink band includes a portion used as a portion of the protection band between the band in the TDD licensed band for achieving the TDD communication and the uplink band of the FDD licensed band, and a portion used as a portion of the protection band between the band in the FDD licensed band for achieving the TDD communication and the uplink band of the FDD licensed band, i.e., the fourth band in FIG. 1, and/or the uplink band of the FDD licensed band, i.e., the first band in FIG. 1; the unidirectional downlink band includes a portion used as a protection band between the band in the TDD licensed band for achieving the TDD communication and the downlink band of the FDD licensed band, and a portion used as a protection band between the band in the FDD licensed band for achieving the TDD communication and the downlink band of the FDD licensed band, i.e., the fifth band in FIG. 1, and/or the downlink band of the FDD licensed band, i.e., the second band in FIG. 1.

The band for achieving the TDD communication is the working band of the TDD system.

The overlapped portion between the uplink band and the downlink band can also be a band in a license-free band used by the uplink transmission and downlink transmission in common in the manner of time division duplexing; or can also be a band in the idle broadcast band used by the uplink transmission and downlink transmission in common in the manner of time division duplexing. The unidirectional downlink band can also be a protection band between the third band and the downlink transmission band of the broadcast system.

Accordingly, the wireless access point and the terminal are also divided into two types respectively, the first type is the wireless access point and terminal which can only transmit signals in the TDD licensed band, and the wireless access point in the TDD system is the first type of wireless access points, and when the communication needs to be carried out in the manner of the FB-TDD, the unidirectional uplink band and unidirectional downlink band can only include the portion in the TDD licensed band used as the protection band; and the second type is the wireless access point and terminal which not only can transmit signals in the TDD licensed band but also can transmit signals in the FDD licensed band, and they transmit signals in the FDD licensed band through the FDD radio frame and transmit signals in the bidirectionally used band in the TDD licensed band through the TDD radio frame, and transmit signals in the band in the TDD licensed band used as the protection band according to the practical situation and needs by way of the TDD radio frame or FDD radio frame, and the radio frames used in each band is strictly synchronous in slots, and the slot synchronization here refers to one of the following manners: 1) the frame headers of the TDD radio frame and FDD radio frame are aligned at the beginning time and the slot widths are aligned; and 2) the frame headers of the TDD radio frame and the FDD radio frame are spaced with a fixed time interval at the beginning time, such as spaced with the time length of a plurality of radio frames/slots.

According to the FB-TDD manner provided by the embodiments of the present invention, the corresponding particular duplex modes for achieving communication include the following modes.

In duplex mode I, as shown in FIGS. 2a, 2b, and 2c, when the downlink band includes a unidirectional downlink band and a bidirectionally used band, and the uplink band only includes a bidirectionally used band, the wireless access point sends a signal to the terminal in the unidirectional downlink band and the bidirectional used band within the first time interval, and the terminal sends a signal to the wireless access point in the bidirectionally used band within the second time interval.

Figure 3C:
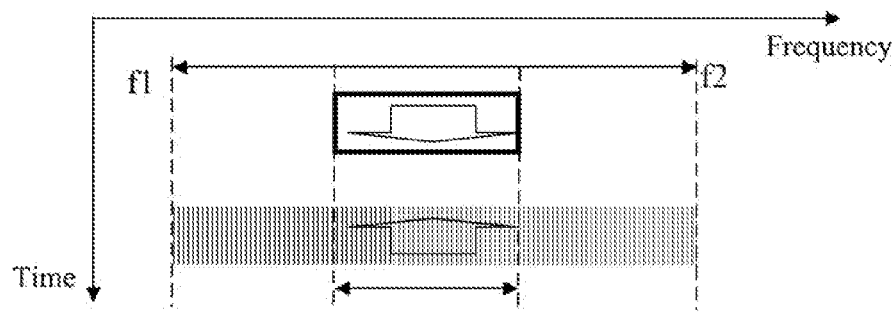

In duplex mode II, as shown in FIGS. 3a, 3b, and 3c, when the downlink band only includes a bidirectionally used band, and the uplink band includes a unidirectional uplink band and a bidirectionally used band, the wireless access point sends a signal to the terminal in the bidirectionally used band within the first time interval, and the terminal sends a signal to the wireless access point in the bidirectionally used band and the unidirectional uplink band within the second time interval.

Figure 4A:
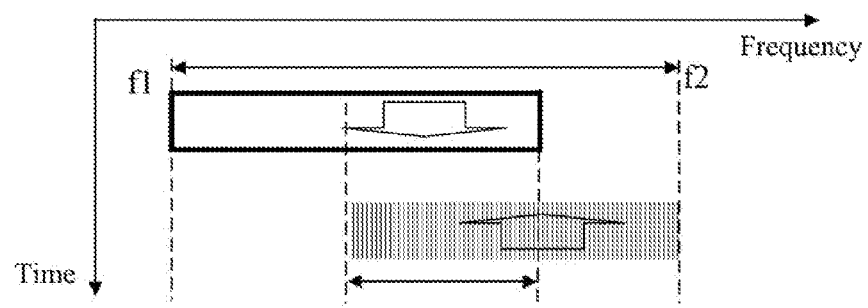
FIGS. 4a-4b are schematic diagram III of the band utilization mode according to the embodiments of the present invention.
Figure 4B:
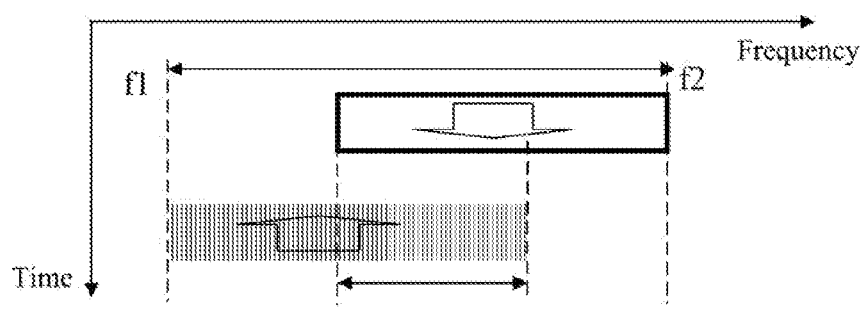

In duplex mode III, as shown in FIGS. 4a and 4b, when the downlink band includes a unidirectional downlink band and a bidirectionally used band, and the uplink band also includes a unidirectional uplink band and a bidirectionally used band, the wireless access point sends a signal to the terminal in the unidirectional downlink band and the bidirectionally used band within the first time interval, and the terminal sends a signal to the wireless access point in the bidirectionally used band and the unidirectional uplink band within the second time interval.

When the terminal and the wireless access point communicate with each other, the duplex communication is achieved using the above three modes.

Furthermore, sending or receiving signals via multi-carrier can be also achieved using the carrier aggregation method, and at this moment, the wireless access point determines the number of carriers used in sending a signal to the terminal according to the maximum number of available carriers when the terminal receives a signal, and determines the number of carriers used in sending a signal to the wireless access point by the terminal according to the maximum number of available carriers when the terminal sends a signal, and at this moment, the receiver in parallel receives the signals sent by multiple carriers.

Figure 2D:
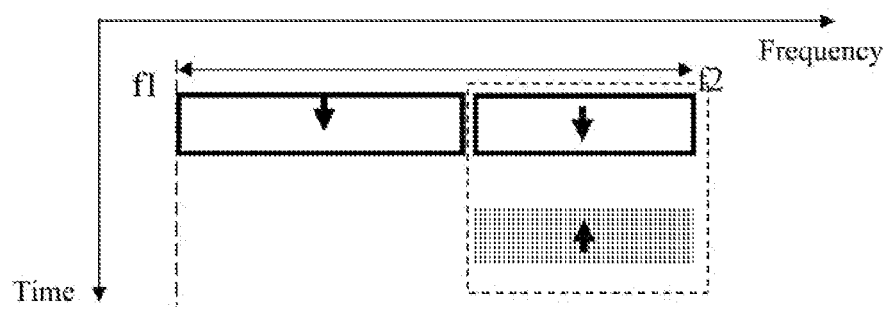
Figure 2E:
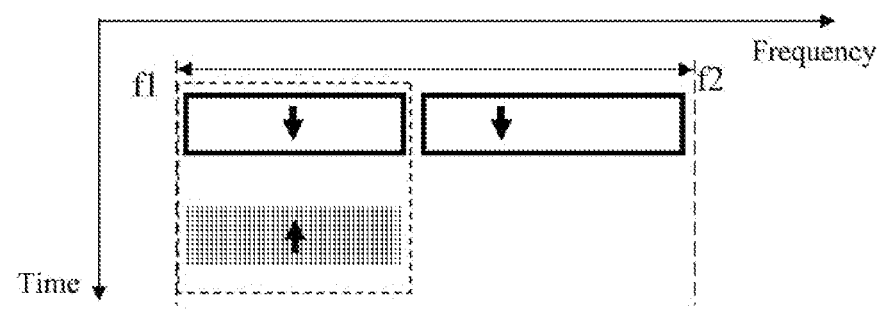

In the situation of duplex mode I, the communication mode using multiple carriers is as shown in FIGS. 2d, 2e, and 2f, and the following two multi-carrier communication modes can be used.

In mode I, the wireless access point sends signals in the bidirectionally used band and the unidirectional downlink band with their respective carriers to the same terminal simultaneously within the first time interval, and the terminal sends signals in the bidirectionally used band with at least one carrier to the wireless access point within the second time interval.

In mode II, the wireless access point sends signals in the bidirectionally used band and the unidirectional downlink band with a same carrier to the terminal within the first time interval, at this moment, there are frequency spectrums of the same carrier modulated by the signal in both the bidirectionally used band and the unidirectional downlink band, and the terminal sends a signal in the bidirectionally used band with at least one carrier to the wireless access point within the second time interval.

Figure 3D:
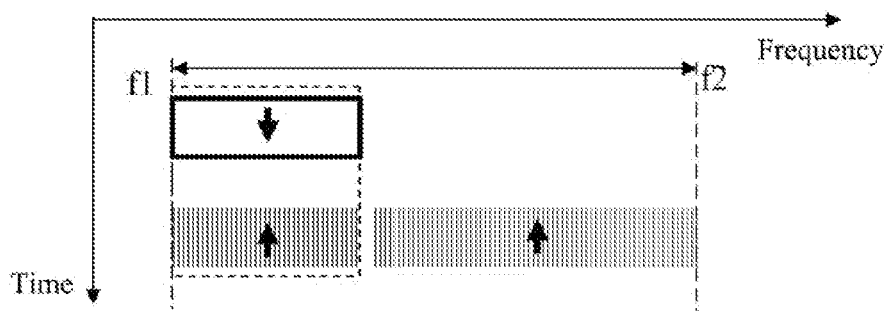
FIGS. 3d-3f are schematic diagram II of communication using multi-carrier according to the embodiments of the present invention.
Figure 3E:
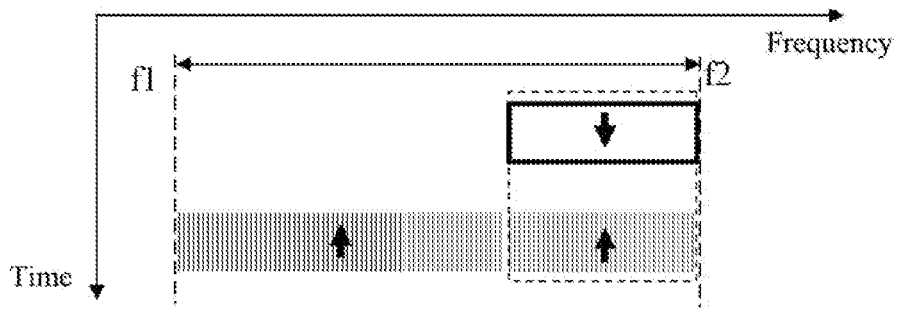
Figure 3F:
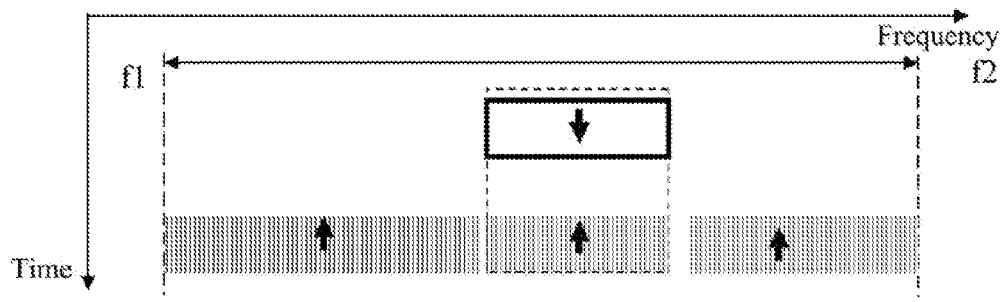

In the situation of duplex mode II, the communication mode using multiple carriers is as shown in FIGS. 3d, 3e, and 3f, and the following two multi-carrier communication modes can be used.

In mode III, the wireless access point sends signals in the bidirectionally used band with at least one carrier to the same terminal simultaneously within the first time interval, and the terminal sends a signal in the bidirectionally used band and unidirectional uplink band with their respective carriers to the wireless access point within the second time interval.

In mode IV, the wireless access point sends signals in the bidirectionally used band with at least one carrier to the terminal within the first time interval, and the terminal sends signals in the bidirectionally used band and the unidirectional uplink band with the same carrier to the wireless access point within the second time interval, and at this moment, there are frequency spectrums of the same carrier modulated by the signal in both the bidirectionally used band and the unidirectional uplink band.

In the situation of duplex mode III, the communication mode using multiple carriers is as shown in FIGS. 4c and 4d, and the following two multi-carrier communication modes can be used.

In Mode V, the wireless access point sends signals in the bidirectionally used band and unidirectional downlink band with their respective carriers to the same terminal simultaneously within the first time interval, and the terminal sends signals in the bidirectionally used band and unidirectional uplink band with their respective carriers to the wireless access point within the second time interval.

In mode VI, the wireless access point sends signals in the bidirectionally used band and unidirectional downlink band with the same carrier to the terminal within the first time interval, at this moment, there are frequency spectrum of the same carrier modulated by the signal in both the bidirectionally used band and unidirectional downlink band, and the terminal sends signals in the bidirectionally used band and the unidirectional uplink band with the same carrier to the wireless access point within the second time interval, and at this moment, there are modulated frequency spectrums of the carrier in both the bidirectionally used band and unidirectional uplink band.

Using their respective carriers in two bands of band I and band II refers to using at least one carrier in band I and using at least one carrier in band II different from the carrier frequency used in band I.

The use of the band according to the embodiments of the present invention will be described by way of particular examples hereinafter.

Figure 5B:
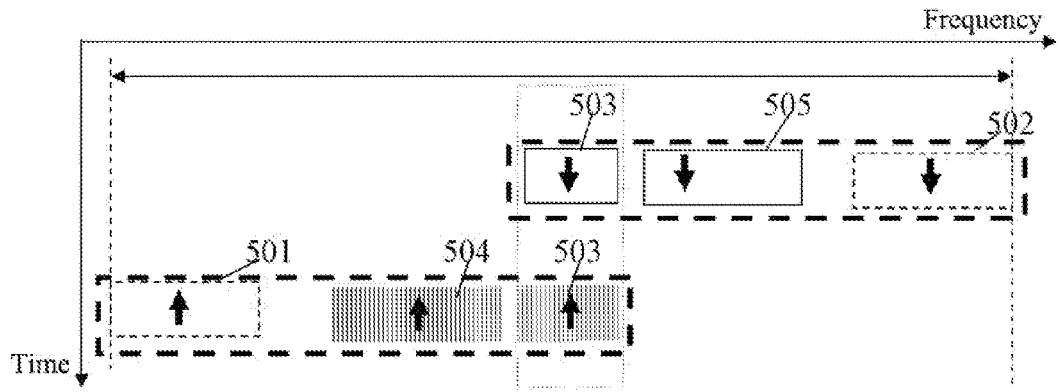

As shown in FIGS. 5a and 5b, the first band 501 and the second band 502 are FDD licensed bands, wherein the first band 501 is an uplink band in the FDD licensed band, and the second band 502 is a downlink band in the FDD licensed band, the third band 503 is a portion in the TDD licensed band for achieving signal transmission in the manner of the time division duplexing and is an overlapped portion between the uplink band and the downlink band, the fourth band 504 is a portion in the TDD licensed band used as the protection band with the FDD uplink band, and the fifth band 505 is a portion in the TDD licensed band used as the protection band with the FDD downlink band.

In FIG. 5a, the fourth band 504 is used as a unidirectional uplink band and is only used for bearing the transmission of the signal sent by the terminal to the wireless access point; the fifth band 505 is used as a unidirectional downlink band and is only used for bearing transmission of the signal sent by the wireless access point to the terminal. At this moment, the terminal and the wireless access point can be the first type or the second type, as long as they can transmit signals in the TDD licensed band.

Since fourth band 504, which is the portion in the TDD licensed band used as a protection band with the FDD uplink band, is only used for transmitting uplink signals, the fifth band 505, which is the portion in the TDD licensed band used as a protection band with the FDD downlink band, is only used for transmitting downlink signals and keeps the synchronization between the TDD frame and the FDD frame, so the inter system interference will not be introduced.

In FIG. 5b, the fourth band 504 and the first band 501 are used as unidirectional uplink bands in common and are only used for bearing the transmission of the signal sent by the terminal to the wireless access point, and the fifth band 505 and the second band 502 are used as unidirectional downlink bands in common and are only used for bearing transmission of the signal sent by the wireless access point to the terminal.

Embodiment II

Figure 6:
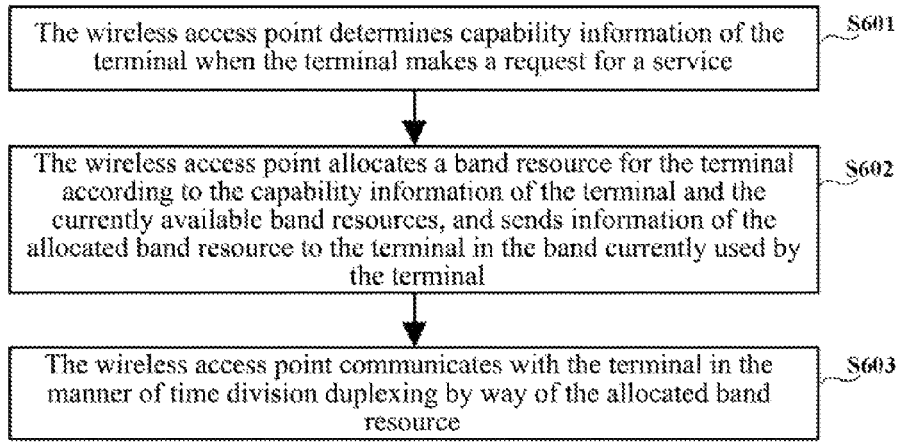
FIG. 6 is a flowchart of a method for scheduling a terminal according to the embodiments of the present invention.

As shown in FIG. 6, the embodiments of the present invention also provide a corresponding method for scheduling a terminal, comprising following steps.

In step S601, a wireless access point determines capability information of the terminal when the terminal make a request for a service, wherein the capability information of the terminal includes a band for receiving signals supported by the terminal, a band for sending signals supported by the terminal, and the capability of the terminal to send and receive signals in parallel in a TDD licensed band and an FDD licensed band.

In step S602, the wireless access point allocates band resources for the terminal according to the capability information of the terminal and the currently available band resources, and sends the allocated band resource information to the terminal in the band currently used by the terminal; when allocating the band resource, other conditions such as the service requested by the terminal can also be referred; the allocated band resources include a bidirectionally used band, and at least one of the uplink band and downlink band includes a unidirectionally used band, wherein the unidirectionally used band is a band for unidirectional uplink transmission or a band for unidirectional downlink transmission.

In step S603, the wireless access point communicates with the terminal in the manner of time division duplexing via the allocated band resources.

In step S601, a particular method for the wireless access point determining the capability information of the terminal comprises: receiving a type parameter or a resource allocation request sent by the terminal in the currently used band, wherein the type parameter or resource allocation request includes the capability information of this terminal.

According to the system in which the terminal currently resides, the currently used band of the terminal can be a bidirectionally used band in the TDD licensed band, i.e., the third band 103, or an FDD licensed band, i.e., the first band 101 and the second band 102. When the terminal resides in the TDD system, the currently used band of the terminal is the bidirectionally used band in the TDD licensed band, and when the terminal resides in the FDD system, the currently used band of the terminal is the FDD licensed band.

In the communication process, if the service used by the terminal requires more resources, or the terminal further initiates other services, the resource allocation request can also be sent to the wireless access point via the currently used band.

In step S602, when the wireless access point allocates a band resource for the terminal according to the capability information of the terminal and the currently available band resources, it first determines a band in which the terminal can receive a signal and a band in which the terminal can send a signal, if the terminal supports to send and receive a signal in the TDD licensed band, then the terminal judges whether the TDD licensed band supported by the terminal can provide the band resource required by the service requested by the terminal, if yes, then directly allocates the band resources in the TDD licensed band to this terminal, and during the allocation, it can only allocate the band resource in the third band 103, and the communication mode at this moment is the conventional TDD communication mode, it may also allocate the resources in the fourth band 104 and/or the fifth band 105 at the meanwhile allocating the band resource in the third band 103; likewise, if the terminal supports to send and receive a signal in the FDD licensed band, then the terminal judges whether the FDD licensed band supported by the terminal can provide the band resource required by the service requested by the terminal, and if yes, then directly allocates the band resource in the FDD licensed band to this terminal.

If the TDD licensed band or FDD licensed band supported by the terminal cannot provide all the band resources required by the service requested by the terminal, then whether the terminal has the capability of sending or receiving a signal in parallel in the TDD licensed band and FDD licensed band is further determined, and if yes and the band in which a signal can be received supported by the terminal and the band in which a signal can be sent supported by the terminal have the resources required by the service requested by the terminal, then bands supported by the terminal and capable of providing band resources in the TDD licensed band and FDD licensed band are selected to allocate the band resource therein to the terminal, and in the allocated band resources, the uplink band the downlink band should have an overlapped portion, and at least one of the uplink band the downlink band should have a dedicated portion.

In this case, the overlapped portion is a bidirectionally used band for communication in the TDD licensed band, i.e., the third band 103, and the dedicated portion is only used in the uplink or downlink, i.e., the unidirectional uplink band and the unidirectional downlink band, which are portions in the TDD licensed band and FDD licensed band used as the protection bands and/or the working band of the FDD system.

The terminal and the wireless access point communicate using the TDD radio frame in the TDD licensed band, and communicate using the FDD radio frame in the FDD licensed band; when their respective carriers in the bidirectionally used band in the TDD licensed band and in the dedicated portion of the uplink/downlink bands are used to send a signal and the dedicated portion includes the portions of the FDD licensed band and TDD licensed band used as the protection bands, the FDD radio frame is used in the portion of the TDD licensed band used as the protection band; and when their respective carriers in the bidirectionally used band in the TDD licensed band and in the dedicated portion of the uplink/downlink band are used to send a signal and the dedicated portion only includes the portion of the TDD licensed band used as the protection band, the TDD radio frame or the FDD wireless frame is used for communication in the protection band between the TDD licensed band and the FDD licensed band.

Furthermore, in order to avoid the interference between the TDD system and the FDD system, when communicating with the terminal in the manner of time division duplexing via the allocated band resources, the downlink radio frame in the TDD licensed band, the portion of the TDD licensed band used as the protection band and the FDD licensed band keep synchronous in slots, and the slot synchronization described here refers to alignment of the slots that form the radio frame.

When the terminal and the wireless access point communicate with each other in the manner of time division duplexing, according to the distribution of the overlapped portion of the uplink band and downlink band as well as the dedicated portion, the communication modes include the duplex mode I, duplex mode II and duplex mode III mentioned in embodiment I.

Furthermore, sending or receiving signals via multiple carriers can be also achieved using the carrier aggregation method, at this moment, the wireless access point can also determine the number of carriers used to send a signal to the terminal according to the maximum number of carriers which can be used to receive a signal by the terminal, and determine the number of carriers used to send a signal to the wireless access point by the terminal according to the maximum number of carriers which can be used to send a signal by the terminal.

At this moment, the capability information of the terminal further includes: the maximum number of available carriers when the terminal receives a signal and the maximum number of available carriers when the terminal sends a signal, and the number of carriers used for sending the signaling can be determined according to the maximum number of the available carriers when the terminal receives a signal and the maximum number of available carriers when the terminal sends a signal and the practical needs, and at this moment, the receivers in parallel receive the signals sent by multiple carriers.

According to different duplex modes, the communication modes using multiple carriers mainly include modes I to VI mentioned in embodiment I.

Figure 7:
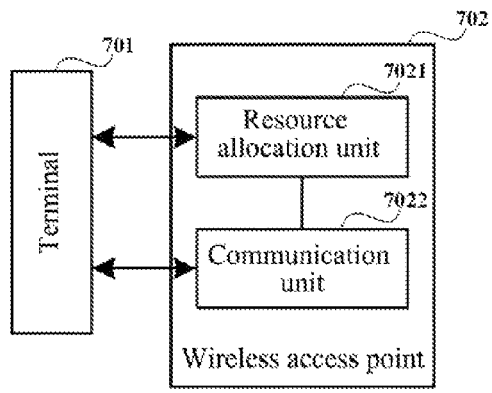
FIG. 7 is a structural schematic diagram of a system for scheduling a terminal according to the embodiments of the present invention.

The embodiments of the present invention also provide a system for scheduling a terminal, and as shown in FIG. 7, the system comprises: a terminal 701 and a wireless access point 702, wherein the terminal 701 is configured to: receive information of allocated band resources sent by the wireless access point 702, then communicate with the wireless access point 702 in the manner of time division duplexing via the allocated band resource;

the wireless access point 702 is configured to: determine the capability information of the terminal 701, allocate band resources for the terminal 701 according to the capability information of the terminal 701 and the currently available band resources, send the information of the allocated band resource to the terminal 701 in the band currently used by the terminal 701, and communicate with the terminal 701 in the manner of time division duplexing via the allocated band resource, wherein the capability information of the terminal 701 includes a band for receiving signals supported by the terminal 701, a band for sending signals supported by the terminal 701, and the capability of the terminal 701 sending and receiving signals in parallel in a TDD licensed band and an FDD licensed band, the allocated band resources include a unidirectionally used band, and at least one of the uplink band and downlink band includes a unidirectionally used band, wherein the unidirectionally used band is a band for unidirectional uplink transmission or a band for unidirectional downlink transmission.

This capability information can be sent by the terminal 701 to the wireless access point 702, and at this moment, the terminal 701 is further configured to: send a resource allocation request to the wireless access point 702 in the band currently used by the terminal 701, wherein the resource allocation request includes the capability information of the terminal 701; and the wireless access point 702 determines the capability information of the terminal 701 according to the resource allocation request.

In this case, the wireless access point 702 further includes a resource allocation unit 7021 and a communication unit 7022.

The resource allocation unit 7021 is configured to: determine the capability information of the terminal 701, allocate band resources to the terminal 701 according to the capability information of the terminal 701 and the currently available band resources, and send the information of the allocated band resource to the terminal 701 in the band currently used by the terminal 701;

the communication unit 7022 is configured to: communicate with the terminal 701 in the manner of time division duplexing via the allocated band resource allocated by the resource allocation unit 7021.

After determining the capability information of the terminal 701, the resource allocation unit 7021 in the wireless access point 702, according to the capability information of the terminal 701, first judges whether the TDD licensed band or FDD licensed band supported by the terminal 701 can provide the band resource required by the service requested by the terminal, and if yes, then allocates the band resource in the TDD licensed band or FDD licensed band for the terminal 701 according to the band supported by the terminal 701; otherwise, judges, according to the capability information of the terminal 701, whether the terminal 701 has the capability of sending or receiving a signal in the TDD licensed band and FDD licensed band in parallel, if yes and the band for receiving signals supported by the terminal 701 and the band for sending signals supported by the terminal 701 have the resources required by the service requested by the terminal, then allocates the band resource in the TDD licensed band and FDD licensed band to the terminal, wherein the uplink band and downlink band have an overlapped portion within the allocated band resources and at least one of them has a dedicated portion, wherein the overlapped portion is a bidirectionally used portion for communication in the TDD licensed band, and the dedicated portion is a unidirectional downlink band dedicated for transmitting a downlink signal or a unidirectional uplink band dedicated for transmitting an uplink signal.

The communication unit 7022 particularly has the following communication modes according to different allocated band resources.

The communication unit 7022 sends a signal to the terminal in a downlink band within the first time interval, wherein the downlink band includes a band bidirectionally used with the uplink band in common in the manner of time division and a unidirectional downlink band dedicated for downlink signal transmission; and receives the signal sent by the terminal in an uplink band within the second time interval, wherein the uplink band only includes a band bidirectionally used with the downlink band in common in the manner of time division; and the corresponding terminal 701 receives the signal sent by the wireless access point in a downlink band within the first time interval, wherein the downlink band includes a band bidirectionally used with the uplink band in common in the manner of time division and a unidirectional downlink band dedicated for downlink signal transmission; and sends a signal to the wireless access point in an uplink band within the second time interval, wherein the uplink band only includes a band bidirectionally used with the downlink band in common in the manner of time division; or the communication unit 7022 sends a signal to the terminal in a downlink band within the first time interval, wherein the downlink band only includes a band bidirectionally used with the uplink band in common in the manner of time division; and receives the signal sent by the terminal in an uplink band within the second time interval, wherein the uplink band includes a band bidirectionally used with the downlink band in common in the manner of time division and a unidirectional uplink band dedicated for uplink signal transmission; and the corresponding terminal 701 receives the signal sent by the wireless access point in a downlink band within the first time interval, wherein the downlink band only includes a band bidirectionally used with the uplink band in common in the manner of time division; and sends a signal to the wireless access point in an uplink band within the second time interval, wherein the uplink band includes a band bidirectionally used with the downlink band in common in the manner of time division and a unidirectional uplink band dedicated for uplink signal transmission; or the communication unit 7022 sends a signal to the terminal in a downlink band within the first time interval, wherein the downlink band includes a band bidirectionally used with the uplink band in common in the manner of time division and a unidirectional downlink band dedicated for downlink signal transmission; and receives the signal sent by the terminal in an uplink band within the second time interval, wherein the uplink band only includes a band bidirectionally used with the downlink band in common in the manner of time division and a unidirectional uplink band dedicated for uplink signal transmission; and the corresponding terminal 701 receives the signal sent by the wireless access point in a downlink band within the first time interval, wherein the downlink band includes a band bidirectionally used with the uplink band in common in the manner of time division and a unidirectional downlink band dedicated for downlink signal transmission; and sends a signal to the wireless access point in an uplink band within the second time interval, wherein the uplink band includes a band bidirectionally used with the downlink band in common in the manner of time division and a unidirectional uplink band dedicated for uplink signal transmission.

Furthermore, sending or receiving signals via multiple carriers can be also achieved using the carrier aggregation method, and at this moment, the wireless access point can also determine the number of carriers used to send a signal to the terminal according to the maximum number of available carriers when receiving a signal by the terminal, and determine the number of carriers used to send a signal to the wireless access point by the terminal according to the maximum number of available carriers when sending a signal by the terminal.

At this moment, the capability information of the terminal further includes: the maximum number of available carriers when receiving a signal by the terminal and the maximum number of available carriers when sending a signal by the terminal, and the number of carriers used for sending signals can be determined according to the maximum number of the available carriers when receiving a signal by the terminal and the maximum number of available carriers when sending a signal by the terminal and the practical needs, and at this moment, the receivers in parallel receive the signals sent by multiple carriers.

The method for duplexing communication, and the method and system for scheduling a terminal provided by the present invention achieve communication in the manner of time division duplexing by the allocated band resource, and the allocated band resource further includes band resources around the portion for achieving the TDD system communication in the TDD licensed band besides including the portion used in the uplink and downlink in the TDD licensed band for achieving the communication of the TDD system, making the best of the band resources around the TDD licensed band and improving the communication efficiency.

Those skilled in the art shall understand that all of or parts of the steps in the above methods can be completed by instructing relevant hardware by programs, and the programs can be stored in a computer readable storage medium, such as the read only memory, magnetic disk, or optical disk, etc. Optionally, all of or parts of the steps of the above embodiments can also be implemented using one or more integrated circuits. Accordingly, various units in the above embodiments can be implemented in the form of hardware and can also be implemented in the form of software function modules. The present invention is not limited to any particular form of combination of hardware and software.

Apparently, those skilled in the art can make various modifications and variations to the embodiments of the present invention without departing from the spirit and scope of the present invention. Thus, if these modifications and variations of the present invention belong to the scope of the claims of the present invention and the equivalent technologies thereof, the present invention is also intended to contain these modifications and variations.

INDUSTRIAL APPLICABILITY

The method for duplexing communication, and the method and system for scheduling a terminal provided by the present invention achieve communication in the manner of time division duplexing by the allocated band resource, and the allocated band resource further includes band resources around the portion for achieving the TDD system communication in the TDD licensed band besides including the portion used in the uplink and downlink in the TDD licensed band for achieving the communication of the TDD system, making the best of the band resources around the TDD licensed band and improving the communication efficiency.

What is claimed is:

1. A method for duplexing communication, comprising:
   sending, by a wireless access point, a signal to a terminal in a downlink band within a first time interval; and
   receiving, by the wireless access point, a signal sent by the terminal in an uplink band within a second time interval,
   the downlink band including a bidirectionally used band in a manner of time division and a unidirectional downlink band, and the uplink band only including a bidirectionally used band in the manner of time division; or
   the downlink band only including a bidirectionally used band in the manner of time division, and the uplink band including a bidirectionally used band in the manner of time division and a unidirectional uplink band; or
   the downlink band including a bidirectionally used band in the manner of time division and a unidirectional downlink band, and the uplink band including a bidirectionally used band in the manner of time division and a unidirectional uplink band; wherein
   the downlink band and the uplink band are of a following relationship:
   center frequencies of the downlink band and the uplink band are different, and the downlink band and the uplink band are partially overlapped; or
   center frequencies of the downlink band and the uplink band are the same, and bandwidths of the downlink band and the uplink band are different.

2. The method as claimed in claim 1, wherein the bidirectionally used band is a band used by uplink transmission and downlink transmission in common in a time division duplexing (TDD) licensed band in a manner of time division duplexing; or
   the bidirectionally used band is a band in a license-free band used by the uplink transmission and downlink transmission in common in a manner of time division duplexing; or is an idle sub-band in the television broadcast system licensed band used by the uplink transmission and downlink transmission in common in the manner of time division duplexing.

3. The method as claimed in claim 1, wherein the unidirectional uplink band includes: a portion used as a protection band between a working band of a time division duplexing (TDD) system and an uplink band of a frequency division duplexing (FDD) system in a TDD licensed band and an FDD licensed band, and/or an uplink band of the FDD licensed band; or
   the unidirectional downlink band includes: a portion used as the protection band between the working band of the TDD system and a downlink band of the FDD licensed band in the TDD licensed band and the FDD licensed band, and/or a downlink band of the FDD licensed band; or
   the unidirectional downlink band includes: a portion used as the protection band between the working band of the TDD system and the downlink transmission band of the television broadcast system.

4. The method as claimed in claim 1, wherein when the downlink band includes the bidirectionally used band in the manner of time division and the unidirectional downlink band, and the uplink band only includes a bidirectionally used band in the manner of time division;
   the step of sending by a wireless access point the signal to the terminal in the downlink band within the first time interval comprises: sending, by the wireless access point, the signal simultaneously in the bidirectionally used band and unidirectional downlink band with their respective carriers to the terminal within the first time interval; and the step of receiving by the wireless access point the signal sent by the terminal in the uplink band within the second time interval comprises: receiving by the wireless access point the signal sent by the terminal in the bidirectional band used with at least one carrier within the second time interval; or
   the step of sending by the wireless access point the signal to the terminal in the downlink band within the first time interval comprises: sending by the wireless access point the signal simultaneously in the bidirectionally used band and the unidirectional downlink band with a same carrier to the terminal within the first time interval and there being a frequency spectrum of the same carrier modulated by the signal in both the bidirectionally used band and the unidirectional downlink band; and the step of receiving by the wireless access point the signal sent by the terminal in the uplink band within the second time interval comprises: receiving by the wireless access point the signal sent by the terminal in the bidirectionally used band with at least one carrier within the second time interval; or
   when the downlink band only includes the bidirectionally used band in the manner of the time division, and the uplink band includes the bidirectionally used band in the manner of time division and the unidirectional uplink band,
   the step of sending by the wireless access point the signal to the terminal in the downlink band within the first time interval comprises: sending by the wireless access point the signal to the terminal in the bidirectionally used band with at least one carrier within the first time interval; and the step of receiving by the wireless access point the signal sent by the terminal in the uplink band within the second time interval comprises: receiving by the wireless access point the signal sent by the terminal in the bidirectionally used band and the unidirectional uplink band with the same carrier and there being a frequency spectrum of the same carrier modulated by the signal in both the bidirectionally used band and the unidirectional uplink band; or
   the step of sending by the wireless access point the signal to the terminal in the downlink band within the first time interval comprises: sending by the wireless access point the signal to the terminal in the bidirectionally used band with at least one carrier within the first time interval; and the step of receiving by the wireless access point the signal sent by the terminal in the uplink band within the second time interval comprises: receiving by the wireless access point the signal sent by the terminal in the bidirectionally used band and the unidirectional uplink band with the same carrier and there being a frequency spectrum after the signal being modulated in the bidirectionally used band and the unidirectional uplink band; or when the downlink band includes the bidirectionally used band in the manner of time division and the unidirectional downlink band, and the uplink band includes the bidirectionally used band in the manner of time division and the unidirectional uplink band, the step of sending by the wireless access point the signal to the terminal in the downlink band within the first time interval comprises: sending by the wireless access point the signal simultaneously in the bidirectionally used band and the unidirectional downlink band with their respective carriers to the terminal within the first time interval; and the step of receiving by the wireless access point the signal sent by the terminal in the uplink band within the second time interval comprises: receiving by the wireless access point the signal sent by the terminal in the bidirectionally used band and the unidirectional uplink band with their respective carriers within the second time interval; or the step of sending by the wireless access point the signal to the terminal in the downlink band within the first time interval comprises: sending by the wireless access point the signal in the bidirectionally used band and the unidirectional downlink band with the same carrier to the terminal within the first time interval and there being a frequency spectrum of the same carrier modulated by the signal in both the bidirectionally used band and the unidirectional downlink band; and the step of receiving by the wireless access point the signal sent by the terminal in the uplink band within the second time interval comprises: receiving by the wireless access point the signal sent by the terminal in the bidirectionally used band and the unidirectional uplink band with the same carrier within the second time interval and there being the frequency spectrum of the same carrier modulated by the signal in both the bidirectionally used band and the unidirectional uplink band.

5. The method as claimed in claim 4, wherein when the wireless access point sends the signal to the terminal in the downlink band within the first time interval and the wireless access point receives the signal sent by the terminal in the uplink band within the second time interval, a TDD radio frame is used in the bidirectionally used band for communication;

an FDD radio frame is used in the FDD licensed band for communication;

if the unidirectional uplink band or the unidirectional downlink band only includes the portion used as the protection band in the TDD licensed band, then the TDD radio frame or the FDD radio frame is used in the portion used as the protection band in the TDD licensed band for communication.

6. A method for scheduling a terminal, comprising:
determining capability information of a terminal when the terminal makes a request for a service, wherein the capability information includes a band for receiving a signal supported by the terminal, a band for sending a signal supported by the terminal, and a capability of the terminal sending and receiving a signal in parallel in a time division duplexing (TDD) licensed band and a frequency division duplexing (FDD) licensed band;

allocating a band resource for the terminal according to the capability information of the terminal and currently available band resources, and sending information of the allocated band resource to the terminal in a band currently used by the terminal, wherein the allocated band resource includes a bidirectionally used band, and at least one of an uplink band and a downlink band includes a unidirectionally used band, and the unidirectionally used band is a band for unidirectional uplink transmission or a band for unidirectional downlink transmission; and communicating with the terminal in a manner of time division duplexing by way of the allocated band resource; wherein the downlink band and the uplink band are of a following relationship:

center frequencies of the downlink band and the uplink band are different, and the downlink band and the uplink band are partially overlapped; or center frequencies of the downlink band and the uplink band are the same, and bandwidths of the downlink band and the uplink band are different.

7. The method as claimed in claim 6, wherein the step of allocating the band resource to the terminal according to the capability information of the terminal and the currently available band resources comprises:

after determining that the TDD licensed band or FDD licensed band supported by the terminal is capable of providing the band resource needed by the service requested by the terminal according to the capability information, allocating the band resource in the TDD licensed band or FDD licensed band to the terminal; or after determining that the terminal has the capability of sending or receiving the signal in parallel in the TDD licensed band and FDD licensed band and determining that the band for receiving the signal supported by the terminal and the band for sending the signal supported by the terminal have the band resource needed by the service requested by the terminal, allocating the band resource in the TDD licensed band and FDD licensed band to the terminal, wherein the uplink band and downlink band have an overlapped portion within the allocated band resource and at least one of the uplink band and the downlink band has a dedicated portion, the overlapped portion is a bidirectionally used portion in the TDD licensed band in the manner of time division.

8. The method as claimed in claim 7, wherein the dedicated portion comprises:

a protection band between a working band of the TDD system and a working band of the FDD system, and/or the working band of the FDD system.

9. The method as claimed in claim 8, wherein the step of communicating with the terminal in the manner of time division duplexing by way of the allocated band resource comprises:

using a TDD radio frame in the bidirectional band used for communication;

using an FDD radio frame in the FDD licensed band for communication; and when sending signals in the bidirectionally used band and the unidirectional uplink band with their respective carriers, or when sending the signal in the bidirectionally used band and the unidirectional downlink band with their respective carriers, if the unidirectional uplink band or the unidirectional downlink band includes a portion used as a protection band between the FDD licensed band and the TDD licensed band, then using the FDD radio frame in the portion used as the protection band in the TDD licensed band for communication; and if the unidirectional uplink band or the unidirectional downlink band only includes a portion used as a protection band in the TDD licensed band, then using the TDD radio frame or the FDD radio frame in the portion used as the protection band in the TDD licensed band for communication.

10. The method as claimed in claim 6, wherein the step of communicating with the terminal in the manner of time division duplexing by way of the allocated band resource comprises: sending the signal to the terminal in the downlink band within the first time interval, wherein the downlink band includes a bidirectionally used band in the manner of time division and a unidirectional downlink band; and receiving the signal sent by the terminal in the uplink band within the second time interval, wherein the uplink band only includes a bidirectionally used band in the manner of time division; or the step of communicating with the terminal in the manner of time division duplexing by way of the allocated band resource comprises: sending the signal to the terminal in a downlink band within the first time interval, wherein the downlink band only includes a band bidirectionally used with the uplink band in common in the manner of time division; and receiving the signal sent by the terminal in an uplink band within the second time interval, wherein the uplink band includes a band bidirectionally used with the downlink band in common in the manner of time division and a unidirectional uplink band dedicated for uplink signal transmission; or the step of communicating with the terminal in the manner of time division duplexing by way of the allocated band resource comprises: sending the signal to the terminal in a downlink band within the first time interval, wherein the downlink band includes a band bidirectional used with the uplink band in common in the manner of time division and a unidirectional downlink band dedicated for downlink signal transmission; and receiving the signal sent by the terminal in an uplink band within the second time interval, wherein the uplink band includes a band bidirectional used with the downlink band in common in the manner of time division and a unidirectional uplink band dedicated for uplink signal transmission.

11. The method as claimed in claim 10, wherein the capability information further includes: a maximum number of carriers used for the terminal receiving the signal and a maximum number of carriers used for the terminal sending the signal;

the step of sending the signal to the terminal in the downlink band within the first time interval comprises: sending the signal in the bidirectionally used band and the unidirectional downlink band with their respective carriers to the terminal within the first time interval according to the maximum number of carriers used for the terminal receiving the signal; and the step of receiving the signal sent by the terminal in the uplink band within the second time interval comprises: receiving the signal sent by the terminal in the bidirectionally used band with at least one carrier within the second time interval according to the maximum number of carriers for the terminal sending the signal; or the step of sending the signal to the terminal in the downlink band within the first time interval comprises: sending the signal in the bidirectionally used band and the unidirectional downlink band with a same carrier to the terminal within the first time interval according to the maximum number of carriers used for the terminal receiving the signal; and there is a frequency spectrum of the same carrier modulated by the signal in the bidirectionally used band and unidirectional downlink band respectively; and the step of receiving the signal sent by the terminal in the uplink band within the second time interval comprises: receiving the signal sent by the terminal in the bidirectionally used band with at least one carrier within the second time interval according to the maximum number of carriers for the terminal sending the signal.

12. The method as claimed in claim 11, wherein the capability information further includes: a maximum number of carriers used for the terminal receiving the signal and a maximum number of carriers used for the terminal sending the signal;

the step of sending the signal to the terminal in the downlink band within the first time interval comprises: sending the signal in the bidirectionally used band with at least one carrier to the terminal within the first time interval according to the maximum number of carriers used for the terminal receiving the signal; the step of receiving the signal sent by the terminal in the uplink band within the second time interval comprises: receiving the signal sent by the terminal in the bidirectionally used band and the unidirectional uplink band with their respective carriers within the second time interval according to the maximum number of carriers for the terminal sending the signal; or the step of sending the signal to the terminal in a downlink band within the first time interval comprises: sending the signal in the bidirectional band used with at least one carrier to the terminal within the first time interval according to the maximum number of carriers used for the terminal receiving the signal; the step of receiving the signal sent by the terminal in the uplink band within the second time interval comprises: receiving the signal sent by the terminal in the bidirectionally used band and the unidirectional uplink band with a same carrier within the second time interval according to the maximum number of carriers used for the terminal sending the signal; and there is a frequency spectrum of the same carrier modulated by the signal in both the bidirectionally used band and the unidirectional uplink band.

13. The method as claimed in claim 12, wherein the capability information further includes: a maximum number of carriers used for the terminal receiving the signal and a maximum number of carriers used for the terminal sending the signal;

the step of sending the signal to the terminal in the downlink band within the first time interval comprises: sending the signal to the terminal in the bidirectionally used band and unidirectional downlink band with their respective carriers within the first time interval according to the maximum number of carriers used for the terminal receiving the signal; the step of receiving the signal sent by the terminal in the uplink band within the second time interval comprises: receiving the signal sent by the terminal in the bidirectionally used band and the unidirectional uplink band with their respective carriers within the second time interval according to the maximum number of carriers for the terminal sending the signal; or the step of sending the signal to the terminal in the downlink band within the first time interval comprises: sending the signal in the bidirectionally used band and the unidirectional downlink band with a same carrier to the terminal within the first time interval according to the maximum number of carriers used for the terminal receiving the signal; and there is a frequency spectrum of the same carrier modulated by the signal in both the bidirectionally used band and the unidirectional downlink band; the step of receiving the signal sent by the terminal in the downlink band within the second time interval comprises: receiving the signal sent by the terminal in the bidirectionally used band and the unidirectional uplink band with a same carrier within the second time interval according to the maximum number of carriers used for the terminal sending the signal; and there is the frequency spectrum of the same carrier modulated by the signal in both the bidirectionally used band and the unidirectional uplink band.

14. The wireless access point as claimed in claim 10, further comprising:
a resource allocation unit, configured to: determine capability information of the terminal, allocate a band resource to the terminal according to the capability information of the terminal and currently available band resources, and send information of the allocated band resource to the terminal through the sending module; wherein
the wireless access point communicates with the terminal in a manner of time division duplexing by way of the allocated band resource allocated by the resource allocation unit through the sending unit and the receiving unit.

15. A system for scheduling a terminal, comprising:
a terminal, configured to: communicate in a manner of time division duplexing by way of an allocated band resource after receiving information of the allocated band resource; and
a wireless access point, configured to: determine capability information of the terminal, allocate the band resource for the terminal according to the capability information of the terminal and currently available band resources, send the information of the allocated band resource to the terminal in a band currently used by the terminal, and communicate with the terminal in the manner of time division duplexing by way of the allocated band resource, wherein the capability information includes a band for receiving a signal supported by the terminal, a band for sending a signal supported by the terminal, and a capability of the terminal sending and receiving a signal in parallel in a time division duplexing (TDD) licensed band and a frequency division duplexing (FDD) licensed band, the allocated band resource includes a unidirectionally used band, and at least one of an uplink band and a downlink band includes a unidirectionally used band, wherein the unidirectionally used band is a band for unidirectional uplink transmission or a band for unidirectional downlink transmission; wherein
the downlink band and the uplink band are of a following relationship:
center frequencies of the downlink band and the uplink band are different, and the downlink band and the uplink band are partially overlapped; or
center frequencies of the downlink band and the uplink band are the same, and bandwidths of the downlink band and the uplink band are different.

16. The system as claimed in claim 15, wherein
the terminal is further configured to: send a resource allocation request to the wireless access point in the band currently used by the terminal, wherein the resource allocation request includes the capability information of the terminal;
the wireless access point is further configured to: determine the capability information of the terminal according to the resource allocation request.

17. The system as claimed in claim 15, wherein the wireless access point comprises:
a resource allocation unit, configured to: determine the capability information of the terminal, allocate the band resource to the terminal according to the capability information of the terminal and the currently available band resources, and send the information of the allocated band resource to the terminal; and
a communication unit, configured to: communicate with the terminal in the manner of time division duplexing by way of the allocated band resource allocated by the resource allocation unit.

18. The system as claimed in claim 17, wherein when allocating the band resource to the terminal according to the capability information of the terminal and the currently available band resources,
after determining that the TDD licensed band or FDD licensed band supported by the terminal is capable of providing the band resource needed by the service requested by the terminal according to the capability information, the resource allocation unit allocates the band resource in the TDD licensed band or FDD licensed band to the terminal; or
after determining that the terminal has the capability of sending or receiving a signal in parallel in the TDD licensed band and FDD licensed band and determining that the band for receiving the signal supported by the terminal and the band for sending the signal supported by the terminal have the band resource needed by the service requested by the terminal, the resource allocation unit allocates the band resource in the TDD licensed band and FDD licensed band for the terminal, wherein the uplink band and downlink band have an overlapped portion within the allocated band resource and at least one of the uplink band and downlink band has a dedicated portion, the overlapped portion is a bidirectionally used band in the TDD licensed band for communication, and the dedicated portion is a unidirectional downlink band dedicated for downlink signal transmission or a unidirectional uplink band dedicated for uplink signal transmission.

19. The system as claimed in claim 17, wherein when communicating with the terminal in the manner of time division duplexing, the communication unit sends the signal to the terminal in the downlink band within the first time interval, wherein the downlink band includes a band bidirectionally used with the uplink band in common in the manner of time division and a unidirectional downlink band dedicated for downlink signal transmission; and receives the signal sent by the terminal in an uplink band within the second time interval, wherein the uplink band only includes a band bidirectionally used with the downlink band in common in the manner of time division; and after receiving the information of the allocated band resource, the terminal receives the signal sent by the communication unit of the wireless access point in a downlink band within the first time interval, wherein the downlink band includes a band bidirectionally used with the uplink band in the manner of time division and a unidirectional downlink band dedicated for downlink signal transmission; and sends a signal to the communication unit of the wireless access point in an uplink band within the second time interval, wherein the uplink band only includes a band bidirectionally used with the downlink band in common in the manner of time division; or when communicating with the terminal in the manner of time division duplexing, the communication unit sends a signal to the terminal in a downlink band within the first time interval, wherein the downlink band only includes a band bidirectionally used with the uplink band in common in the manner of time division; and receives the signal sent by the terminal in an uplink band within the second time interval, wherein the uplink band includes a band bidirectionally used with the downlink band in common in the manner of time division and a unidirectional uplink band dedicated for uplink signal transmission; and after receiving the information of the allocated band resource, the terminal receives the signal sent by the communication unit of the wireless access point in a downlink band within the first time interval, wherein the downlink band only includes a band bidirectionally used with the uplink band in common in the manner of time division; and sends a signal to the communication unit of the wireless access point in an uplink band within the second time interval, wherein the uplink band includes a band bidirectionally used with the downlink band in common in the manner of time division and a unidirectional uplink band dedicated for uplink signal transmission; or when communicating with the terminal in the manner of time division duplexing, the communication unit sends a signal to the terminal in a downlink band within the first time interval, wherein the downlink band includes a band bidirectional used with the uplink band in common in the manner of time division and a unidirectional downlink band dedicated for downlink signal transmission; and receives the signal sent by the terminal in an uplink band within the second time interval, wherein the uplink band only includes a band bidirectional used with the downlink band in common in the manner of time division and a unidirectional uplink band dedicated for uplink signal transmission; and after receiving the information of the allocated band resource, the terminal receives the signal sent by the communication unit of the wireless access point in a downlink band within the first time interval, wherein the downlink band includes a band bidirectionally used with the uplink band in the manner of time division and a unidirectional downlink band dedicated for downlink signal transmission; and sends a signal to the communication unit of the wireless access point in an uplink band within the second time interval, wherein the uplink band only includes a band bidirectionally used with the downlink band in common in the manner of time division and a unidirectional uplink band dedicated for uplink signal transmission.

20. A wireless access point, comprising:

a sending unit, configured to send a signal to a terminal in a downlink band within a first time interval; and a receiving unit, configured to received a signal sent by the terminal in an uplink band within a second time interval, the downlink band including a bidirectionally used band in a manner of time division and a unidirectional downlink band, and the uplink band only including a bidirectionally used band in the manner of time division; or the downlink band only including a bidirectionally used band in the manner of time division, and the uplink band including a bidirectionally used band in the manner of time division and a unidirectional uplink band; or the downlink band including a bidirectionally used band in the manner of time division and a unidirectional downlink band, and the uplink band including a bidirectionally used band in the manner of time division and a unidirectional uplink band; wherein the downlink band and the uplink band are of a following relationship:

center frequencies of the downlink band and the uplink band are different, and the downlink band and the uplink band are partially overlapped; or center frequencies of the downlink band and the uplink band are the same, and bandwidths of the downlink band and the unlink band are different.

* * * * *